(12) United States Patent
Kubo et al.

(10) Patent No.: US 9,463,836 B2
(45) Date of Patent: Oct. 11, 2016

(54) MOBILE BODY

(71) Applicant: Murata Manufacturing Co., Ltd., Kyoto (JP)

(72) Inventors: Masayuki Kubo, Kyoto (JP); Kenichi Shirato, Kyoto (JP); Shigeru Tsuji, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/656,957

(22) Filed: Mar. 13, 2015

(65) Prior Publication Data

US 2015/0183482 A1 Jul. 2, 2015

Related U.S. Application Data

(63) Continuation of application No. PCT/JP2013/073607, filed on Sep. 3, 2013.

(30) Foreign Application Priority Data

Sep. 18, 2012 (JP) ................................. 2012-204013

(51) Int. Cl.
*B62K 3/00* (2006.01)
*A61H 3/04* (2006.01)
(Continued)

(52) U.S. Cl.
CPC ................ *B62K 3/007* (2013.01); *A61H 3/04* (2013.01); *B62H 1/12* (2013.01); *G05D 1/0891* (2013.01);
(Continued)

(58) Field of Classification Search
CPC ...... B62K 3/007; B62H 1/12; G05D 1/0891; A61H 3/04; A61H 2003/043; A61H 2201/5084; A61H 2201/5069; A61H 2201/1633; A61H 2201/5007; A61H 2201/5028; A61H 2201/5092; A61H 2003/046

See application file for complete search history.

(56) References Cited

U.S. PATENT DOCUMENTS 4,280,578 A * 7/1981 Perkins .................... A61H 3/04
180/19.3
6,553,271 B1 * 4/2003 Morrell .................. B60L 11/18
700/37

(Continued)

FOREIGN PATENT DOCUMENTS

JP 2004-074814 A 3/2004
JP 2005-145293 A 6/2005
(Continued)

OTHER PUBLICATIONS

International Search Report issued in Application No. PCT/JP2013/073607 dated Nov. 19, 2013.
(Continued)

*Primary Examiner* — Paul N Dickson
*Assistant Examiner* — Darlene Condra
(74) *Attorney, Agent, or Firm* — Pearne & Gordon LLP

(57) ABSTRACT

Provided is a mobile body configured to prevent a main body thereof from overturning in a case of being used in a state where an auxiliary wheel is not provided or the auxiliary wheel is not in contact with the ground. In a first control mode, by performing inverted pendulum control all the time, a posture of a main body portion (10) is maintained to be constant. For example, in the case where a user operates a changeover switch, a controller (21) shifts to a second control mode in which the rotation of main wheels (11) is driven and controlled so that an angle of the main body portion (10) with respect to the vertical direction becomes θ1' which is greater than θ1. In the second control mode, the main wheels (11) and an auxiliary wheel (13) are in contact with the ground.

20 Claims, 16 Drawing Sheets

(51) Int. Cl.
*B62H 1/12* (2006.01)
*G05D 1/08* (2006.01)

(52) U.S. Cl.
CPC ... *A61H 2003/043* (2013.01); *A61H 2003/046* (2013.01); *A61H 2201/1633* (2013.01); *A61H 2201/5007* (2013.01); *A61H 2201/5028* (2013.01); *A61H 2201/5069* (2013.01); *A61H 2201/5084* (2013.01); *A61H 2201/5092* (2013.01)

(56) References Cited

U.S. PATENT DOCUMENTS

| | | | | |
|---|---|---|---|---|
| 8,155,828 | B2* | 4/2012 | Fuwa | B62K 17/00 180/21 |
| 2005/0045398 | A1* | 3/2005 | Suzuki | B62D 61/02 180/209 |
| 2007/0052377 | A1* | 3/2007 | Fuwa | B62K 3/00 318/139 |
| 2007/0073425 | A1* | 3/2007 | Nakashima | B62K 3/00 700/71 |
| 2008/0164083 | A1* | 7/2008 | Miki | B60L 15/20 180/165 |
| 2008/0231006 | A1* | 9/2008 | Van Eeden | A61G 5/043 280/7.15 |
| 2010/0070132 | A1* | 3/2010 | Doi | B60L 15/20 701/36 |
| 2010/0082204 | A1* | 4/2010 | Kikuchi | B25J 5/007 701/41 |
| 2010/0114420 | A1* | 5/2010 | Doi | B60N 2/0244 701/31.4 |
| 2010/0193264 | A1* | 8/2010 | Kurek | A61H 3/04 180/19.1 |
| 2010/0194187 | A1* | 8/2010 | Howard | B60T 7/18 303/162 |
| 2011/0035101 | A1* | 2/2011 | Kawada | A61G 5/043 701/36 |
| 2012/0029696 | A1* | 2/2012 | Ota | A61H 3/04 700/250 |
| 2012/0173088 | A1* | 7/2012 | Kobashi | B60B 3/048 701/49 |
| 2013/0018524 | A1* | 1/2013 | Ankers | A61G 5/045 701/1 |

FOREIGN PATENT DOCUMENTS

| | | |
|---|---|---|
| JP | 2007-062682 A | 3/2007 |
| JP | 2007-069688 A | 3/2007 |
| JP | 2007-301071 A | 11/2007 |
| JP | 2008-137448 A | 6/2008 |
| JP | 2009-083774 A | 4/2009 |
| JP | 2009-101484 A | 5/2009 |
| JP | 2010-030441 A | 2/2010 |
| JP | 2010-082717 A | 4/2010 |
| JP | 2011-068167 A | 4/2011 |
| JP | 2011-168236 A | 9/2011 |
| JP | 2012-035076 A | 2/2012 |
| WO | 2012/114597 A1 | 8/2012 |

OTHER PUBLICATIONS

Translation of Written Opinion issued in Application No. PCT/JP2013/073607 dated Nov. 19, 2013.

* cited by examiner

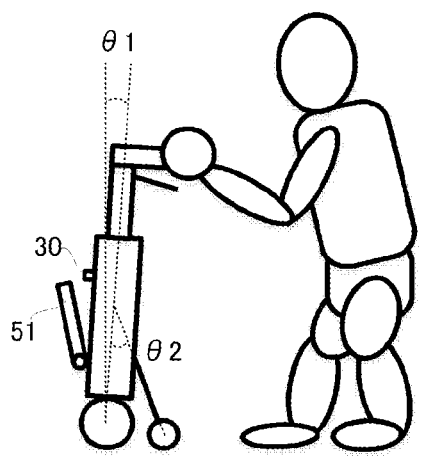
FIG. 7(A)
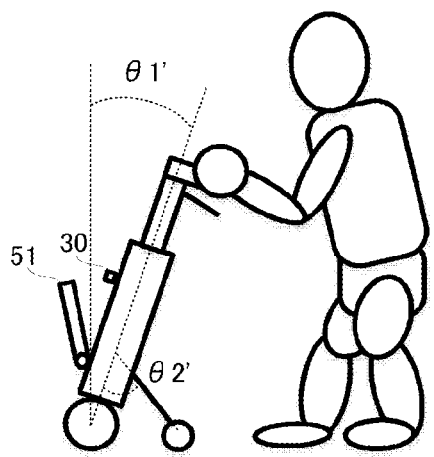
FIG. 7(B)
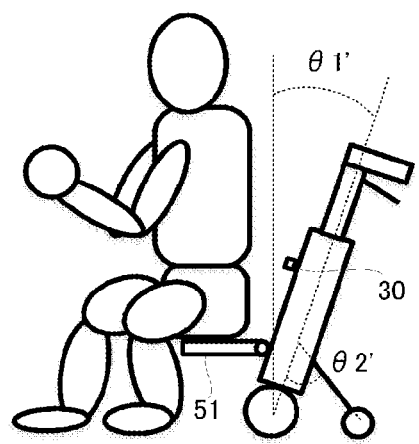
FIG. 7(C)
FIG. 7(D)
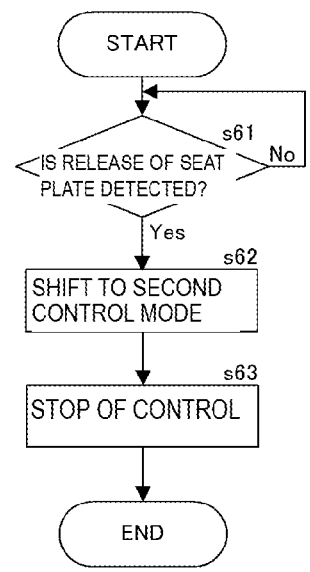

MOBILE BODY

BACKGROUND OF THE INVENTION

1. Field of the Invention

The present invention relates to mobile bodies equipped with wheels, in particular, relates to mobile bodies configured to drive and control wheels.

2. Description of the Related Art

Mobile bodies so configured as to perform inverted pendulum control in which wheels are driven and controlled have been known. For example, Patent Document 1 discloses a coaxial two-wheel vehicle that includes an auxiliary wheel in front of a main wheel and performs inverted pendulum control. The auxiliary wheel thereof is in contact with the ground with a suspension mechanism.

It is disclosed in Patent Document 1 that gripping a brake lever locks the suspension mechanism to immediately stop the rotation of the auxiliary wheel, thereby preventing overturn.

Patent Document 1: Japanese Unexamined Patent Application Publication No. 2011-168236

BRIEF SUMMARY OF THE INVENTION

To perform inverted pendulum control, an auxiliary wheel as disclosed in Patent Document 1 is not essential. However, in a case of being used in a state where an auxiliary wheel is not provided or the auxiliary wheel is not in contact with the ground, it is preferable to pay attention to safety so as to prevent a main body from overturning.

As such, an object of the present invention is to provide a mobile body that prevents the main body from overturning in a case of being used in a state where an auxiliary wheel is not provided or the auxiliary wheel is not in contact with the ground.

A mobile body according to the present invention includes a wheel, a main body portion configured to rotatably support the wheel, a support unit whose one end is connected to the main body portion, a drive controller configured to drive and control the wheel, and a sensor configured to detect an angular change of a slope angle of the main body portion in a pitch direction.

The drive controller has a first control mode in which rotation of the wheel is controlled based on an output from the sensor so that the angular change of the main body portion becomes 0 and the angle of the main body portion with respect to the vertical direction takes a first angle, and a second control mode in which the rotation of the wheel is controlled based on the output from the sensor and the main body portion is inclined toward a side where the support unit is connected so that the angle of the main body portion with respect to the vertical direction takes a second angle which is greater than the first angle; and the mobile body further includes a changeover means configured to switch the first control mode and the second control mode therebetween.

In the first control mode, the main body portion is maintained to have a posture upright in a vertical or substantially vertical direction by inverted pendulum control. Since the mobile body is in a self-standing state in the first control mode, it can be used as a pushcart. In the first control mode, in the case where a changeover command is issued through a changeover switch, for example, the mode is changed to the second control mode in which the posture of the main body portion is largely inclined from being upright in the vertical direction. Since the support unit whose one end is connected to the main body portion is provided in the mobile body, inclining the main body portion toward the side where the support unit being connected makes the support unit be in contact with the ground so as to support the main body portion, thereby making it possible to prevent the overturn. In the second control mode, when the changeover command is issued again, the mode is switched to return to the first control mode.

It is preferable that a second wheel (auxiliary wheel) supported in a rotatable manner be provided at the other end of the support unit. With the auxiliary wheel being in contact with the ground, the mobile body can be used as a pushcart even in a state where operation of the drive controller is stopped.

Further, it is preferable that the support unit be connected rotatably in the pitch direction of the main body portion. In this case, because the posture of the support unit is also maintained in a state upright in the vertical or substantially vertical direction in the first control mode, the support unit will not become an obstacle. In addition, may be employed a mode in which a motor is provided at a connecting portion between the main body portion and the support unit, and the motor is driven and controlled so as to control an angle formed by the main body portion and the support unit.

In the case where the support unit is stretchable so that its length can be varied, for example, it is possible to employ a mode in which the support unit is contracted in the first control mode and extended in the second control mode. In this case, an angle formed by the main body portion and the support unit may be constant.

As examples of triggers to switch between the first control mode and the second control mode, the following can be given.

(1) A case in which a command to stop the wheel rotation is received:

It is a case of a hand brake being provided, for example. In the case where a user sets the hand brake in an ON state so as to issue a command to stop the rotation of the wheel, shifting first to the second control mode allows the mobile body to be in a safe state. Thereafter, by making the hand brake work effectively, the mobile body can be stopped while being in the safe state. Note that the driving and controlling of the wheel may be stopped after the mobile body having been stopped.

(2) A case in which an obstacle is detected by an obstacle detection sensor:

In the case where an obstacle such as a large step, a wall, or the like is detected ahead, it is preferable to first shift to the second control mode so as to shift to a safe state.

(3) A case in which an impact detection sensor is provided and an impact is detected therewith:

In the case where an impact is detected when bumping into an obstacle or the like, it is also preferable to first shift to the second control mode so as to shift to a safe state.

(4) A case in which a seat plate whose one end is rotatably jointed to the main body portion is provided and a state that the seat plate has come to have a predetermined angle with respect to the main body portion is detected:

In the case where the seat plate is opened, it is preferable to determine that the user intends to stop the mobile body, and then shift to a safe state.

(5) A case in which torque generated for the wheel exceeds a predetermined value:

It is also preferable to shift to a safe state in the case where extraordinary torque is generated in a motor due to a foreign object being caught in the wheel, for example.

(6) A case in which a touch sensor is used and a human body has stopped touching the main body portion:

It is also preferable to shift to a safe state in the case where the mobile body is used as a pushcart and a hand of the human body is released therefrom. In this case, it is preferable for the drive controller to stop driving and controlling the wheel after shifting the second control mode.

(7) A case in which a remaining power storage capacity of a power storage means is lowered:

It is also preferable to shift to a safe state in the case where a remaining battery capacity is lowered, because the inverted pendulum control cannot be performed if only a small battery capacity is left and the main body portion can possibly overturn as a result.

(8) A case in which idle rotation of the wheel is detected:

It is also preferable to shift to a safe state in the case where the wheel is idling on a bumpy road or the like. However, in the case where the wheel is idling, it is difficult to drive and control the wheel and shift to the second control mode in some case. In this case, the drive controller shifts to the second control mode by driving and controlling the auxiliary wheel or making the support unit rotate, for example.

According to the present invention, a main body portion can be prevented from overturning even in a case of being used in a state where an auxiliary wheel is not provided or the auxiliary wheel is not in contact with the ground.

BRIEF DESCRIPTION OF THE SEVERAL VIEWS OF THE DRAWINGS

FIGS. 7(A) to 7(D) include diagrams illustrating an example in which the first control mode is switched to the second control mode corresponding to opening/closing of a seat plate.

DETAILED DESCRIPTION OF THE INVENTION

Figure 1:
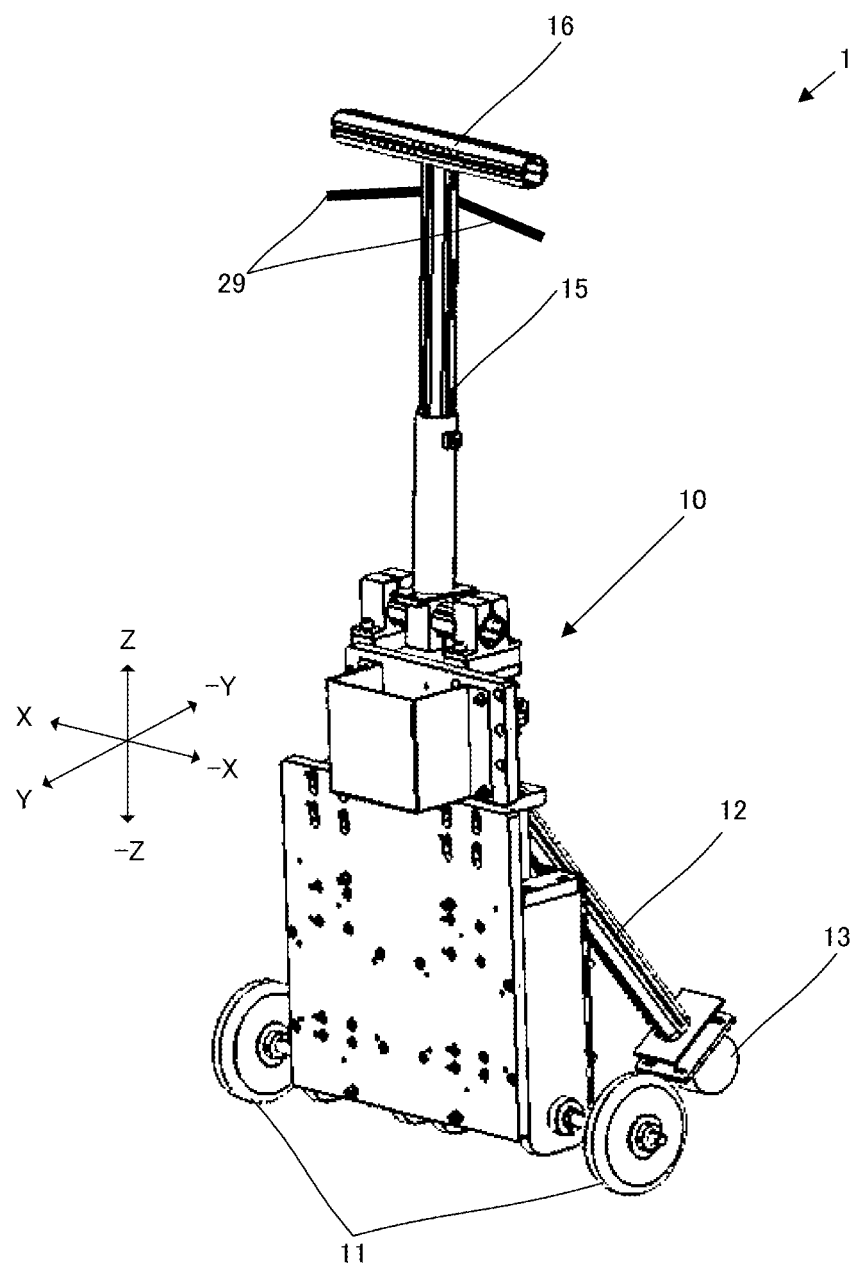
FIG. 1 is an outline view of a coaxial two-wheel vehicle.
Figure 2:
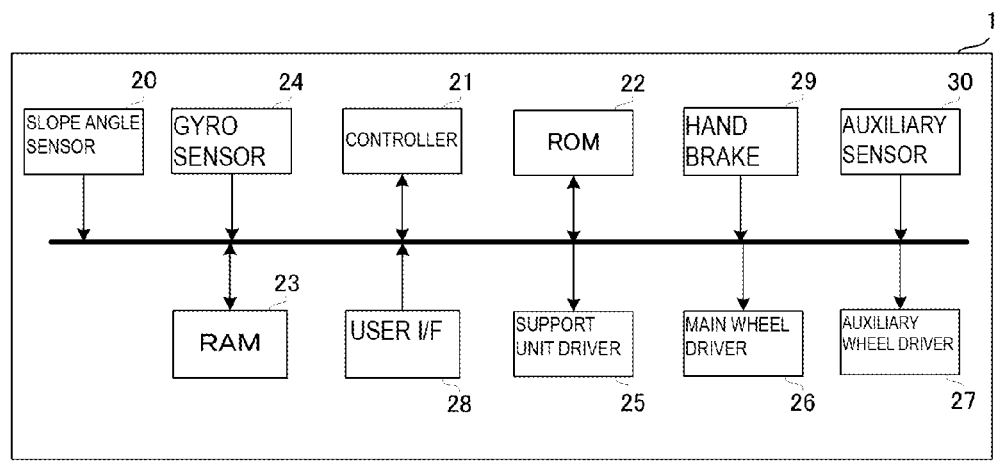
FIG. 2 is a control configuration diagram illustrating a configuration of a coaxial two-wheel vehicle.

FIG. 1 is an outline view of a coaxial two-wheel vehicle 1, which is an embodiment of a mobile body according to the present invention. FIG. 2 is a block diagram illustrating a configuration of the coaxial two-wheel vehicle 1.

The coaxial two-wheel vehicle 1 includes, for example, a main body portion 10 formed in a parallelepiped shape. The main body portion 10 is longer in the vertical direction (Z, −Z direction in the drawing) and shorter in a depth direction (Y, −Y direction in the drawing). The main body portion 10 contains a substrate for operation control, a battery, and so on in the interior thereof.

Two main wheels 11 are attached to left and right end portions (X, −X direction in the drawing) in a lower section of the main body portion 10 in the vertical direction (−Z direction). The two main wheels 11 are attached to the same shaft and rotate in synchronization with each other. Alternatively, the two main wheels 11 can be separately driven and rotated. Although an example in which the main wheels 11 are configured of two wheels is given in the present embodiment, the number of wheels in the main wheels 11 may be one or no less than three.

To an upper section of the main body portion 10 in the vertical direction, one end of a handle 15 formed in a cylinder shape, for example, is attached, and a T-shaped grip unit 16 is attached to the other end of the handle 15. In an upper surface of the grip unit 16, there is provided a user interface (user I/F 28 in FIG. 2) including a power switch and so on. At a position of the handle 15 near the grip unit 16, a hand brake 29 is attached. A user grips the grip unit 16, or rests his or her forearm or the like on the grip unit 16 to make use of the friction between the grip unit and the forearm or the like, and then uses the coaxial two-wheel vehicle 1 as a pushcart.

In reality, a cover is attached to the main body portion 10 so that the substrate and the like installed in the interior thereof cannot be seen from the exterior.

One end of a support unit 12 formed in a bar shape is attached to a rear surface of the main body portion 10 (−Y direction). The above one end of the support unit 12 is connected to the main body portion 10 in a rotatable manner. An auxiliary wheel 13 is attached to the other end of the support unit 12. The support unit 12 is a unit that makes contact with the ground to support the main body portion 10 when the main body portion 10 is largely inclined from a state upright in the vertical direction; that is, this unit prevents the main body portion 10 from overturning (see FIG. 3(B)). Note that the auxiliary wheel 13 is not an essential constituent element in the present invention; however, providing the auxiliary wheel 13 makes it possible to use the coaxial two-wheel vehicle 1 as a pushcart with the main wheels 11 and the auxiliary wheel 13 being in contact with the ground even in a case where the main body portion 10 is largely inclined from a state upright in the vertical direction when the power is turned off. Further, two or more support units 12 and auxiliary wheels 13 may be respectively provided.

Next, a configuration and basic operations of the coaxial two-wheel vehicle 1 will be described. As shown in FIG. 2, the coaxial two-wheel vehicle 1 includes a slope angle sensor 20, a controller 21, a ROM 22, a RAM 23, a gyro sensor 24, a support unit driver 25, a main wheel driver 26, an auxiliary wheel driver 27, the user I/F 28, the hand brake 29, and an auxiliary sensor 30.

The controller 21 is a functional unit configured to overall control the coaxial two-wheel vehicle 1, and realizes various operations through reading out the programs stored in the ROM 22 and loading them into the RAM 23. The slope angle sensor 20 detects a slope angle of the main body portion 10 in the pitch direction (the direction of the rotation about the shaft of the main wheels 11 in FIG. 1) with respect to the vertical direction, and outputs it to the controller 21. The gyro sensor 24 detects an angular velocity of the main body portion 10 in the pitch direction and outputs it to the controller 21. The pushcart 1 may be equipped with an acceleration sensor to detect acceleration of the main body portion 10 in each direction, a rotary encoder to detect an intersecting angle formed by the main body portion 10 and the support unit 12, and so on.

As a basic operation, the controller detects an angular change of the slope angle of the main body portion 10 in the pitch direction based on the detection results of the gyro sensor 24 and the slope angle sensor 20, and controls the main wheel driver 26 so as to make the angular change of the main body portion 10 become 0 as well as make the angle of the main body portion 10 with respect to the vertical direction become 0 (or close to 0). The main wheel driver 26 is a functional unit that is configured to drive a motor to rotate the shaft fixed to the main wheels 11, and rotates the main wheels 11 under the control of the controller 21. Although an example in which the gyro sensor 24 and the slope angle sensor 20 are used herein as means to detect an angular change of the slope angle of the main body portion 10 in the pitch direction, an acceleration sensor can be used or any other sensor may be used instead as the above means. In the case where an intersecting angle of the support unit 12 with respect to the main body portion 10 is detected using a rotary encoder, for example, the slope angle of the main body portion 10 with respect to the vertical direction can be estimated from the detected intersecting angle.

As described above, the coaxial two-wheel vehicle 1 performs inverted pendulum control so as to control the posture of the main body portion 10 to be maintained constant as its basic operation. The coaxial two-wheel vehicle 1 can be used as a pushcart even in a case where a user grips the grip unit 16 and pushes the coaxial two-wheel vehicle 1, because the posture of the coaxial two-wheel vehicle 1 is maintained constant.

The coaxial two-wheel vehicle 1, by performing the inverted pendulum control all the time, is unlikely to overturn even in a case where only the main wheels 11 are in contact with the ground. However, the vehicle can overturn if the power is turned off in a state in which the posture of the main body portion 10 is forward inclined (Y direction) from the posture upright in the vertical direction. As such, the coaxial two-wheel vehicle 1 switches from a first control mode in which the inverted pendulum control is performed to a second control mode which is a state in which the main body portion 10 is supported by the support unit 12 and the auxiliary wheel 13.

Figure 3A:
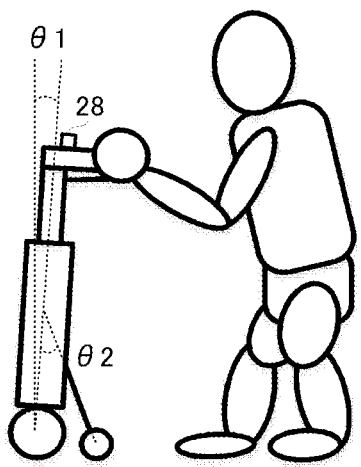
FIGS. 3(A) to 3(C) include diagrams illustrating change-over operation between a first control mode and a second control mode.
Figure 3B:
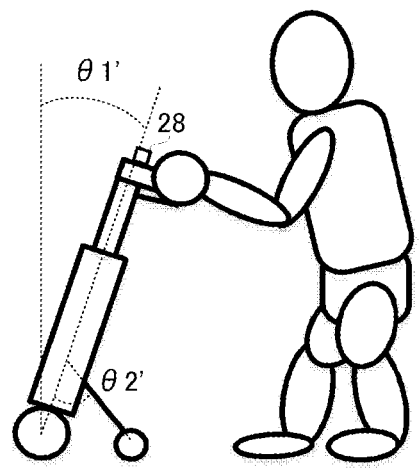
Figure 3C:
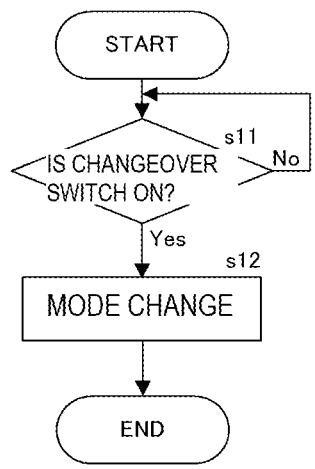

FIGS. 3(A) to 3(C) include diagrams illustrating changeover operation between the first control mode and the second control mode. FIG. 3(A) is a diagram illustrating a posture of the coaxial two-wheel vehicle 1 in the first control mode, while FIG. 3(B) is a diagram illustrating a posture of the coaxial two-wheel vehicle 1 in the second control mode. FIG. 3(C) is a flowchart illustrating operation of the coaxial two-wheel vehicle 1.

In the first control mode shown in FIG. 3(A), as described above, the posture of the main body portion 10 is maintained to be constant by performing the inverted pendulum control all the time. Here, the rotation of the main wheels 11 are driven and controlled so that an angle of the main body portion 10 with respect to the vertical direction becomes $\theta 1$. At this time, an angle formed by the main body portion 10 and the support unit 12 is $\theta 2$.

The angle formed by the main body portion 10 and the support unit 12 is maintained to be $\theta 2$ by the support unit driver 25 driving a motor provided at a connecting portion between the main body portion 10 and the support unit 12 under the control of the controller 21. The angle $\theta 2$ is set to an angle such that the support unit 12 will not become an obstacle when a user pushes the coaxial two-wheel vehicle 1.

Note that, however, the support unit driver 25 is not an essential constituent element in the present invention, and it is sufficient that the support unit 12 is only rotatably connected to the main body portion 10. In this case, when the main body portion 10 takes a posture upright in the vertical or substantially vertical direction, the posture of the support unit 12 is also maintained to be upright in the vertical or substantially vertical direction due to own weight of the support unit 12 and the auxiliary wheel 13. Accordingly, the support unit 12 is prevented from becoming an obstacle.

Here, in the case where a user operates a changeover switch in the user I/F 28 to issue a mode-changeover command (s11), the controller 21 shifts to the second control mode (s12) in which the rotation of the main wheels 11 is driven and controlled so that an angle of the main body portion 10 with respect to the vertical direction becomes $\theta 1'$ which is greater than $\theta 1$ as shown in FIG. 3(B). In the second control mode, the posture of the main body portion 10 is largely inclined toward a side where the support unit 12 is connected. At this time, an angle formed by the main body portion 10 and the support unit 12 becomes $\theta 2'$ which is greater than $\theta 2$. The controller 21 controls the support unit driver 25 to drive the motor provided at the connecting portion between the main body portion 10 and the support unit 12 so that the angle formed by the main body portion 10 and the support unit 12 becomes $\theta 2'$. In the case where the support unit driver 25 is not provided and the support unit 12 is only rotatably connected to the main body portion 10, the above angle expands up to $\theta 2'$ due to the own weight of the support unit 12 and the auxiliary wheel 13.

In the second control mode, the main wheels 11 and the auxiliary wheel 13 are made in contact with the ground. Accordingly, the main body portion 10 is supported by the main wheels 11 and the auxiliary wheel 13, thereby making it possible to prevent the overturn. Even if the auxiliary wheel 13 is not provided, the other end of the support unit 12 is made in contact with the ground so that the main body portion 10 is supported by the main wheels 11 and the support unit 12, thereby making it possible to prevent the overturn. In the second control mode, even if the power is turned off and the inverted pendulum control is released, the main body portion 10 will not overturn. Accordingly, the controller 21, after having shifted to the second control mode, may stop driving and controlling the main wheels 11. Also in this case, since the main wheels 11 and the auxiliary wheel 13 can roll, the vehicle can be used as a pushcart. Further, if the auxiliary wheel 13 is in contact with the ground, the auxiliary wheel driver 27 can rotate the auxiliary wheel 13, under the control of the controller 21, by driving a motor to rotate a shaft fixed to the auxiliary wheel 13 (driving the auxiliary wheel 13 by the auxiliary wheel driver 27 is also not an essential constituent element in the present invention).

In the second control mode, if the changeover command is issued again (s11), the mode is switched to return to the first control mode (s12).

In the example discussed above, as a trigger to switch the first control mode and the second control mode therebetween, a case of using the changeover switch in the user I/F 28 is given; however, the following examples can be also cited.

Figure 4A:
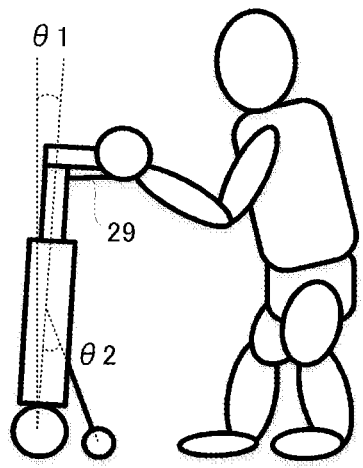
FIGS. 4(A) to 4(D) include diagrams illustrating an example in which the first control mode and the second control mode are switched there between by a hand brake.
Figure 4B:
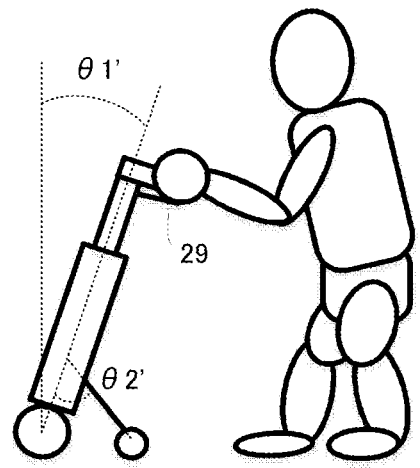
Figure 4C:
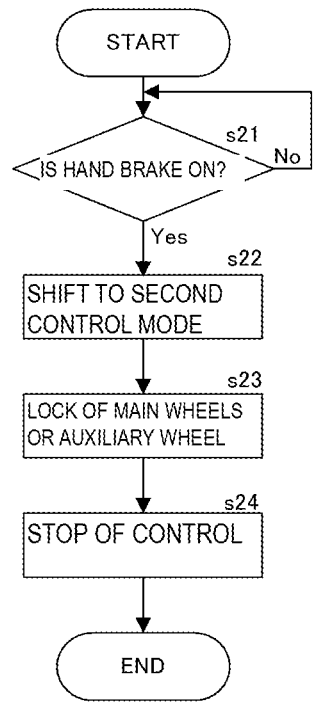
Figure 4D:
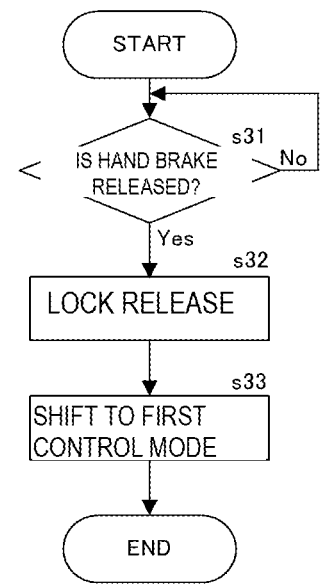

FIGS. 4(A) to 4(D) include diagrams illustrating an example in which the first control mode and the second control mode are switched therebetween using a hand brake. FIG. 4(A) is a diagram illustrating a posture of the coaxial two-wheel vehicle 1 in the first control mode, and FIG. 4(B) is a diagram illustrating a posture of the coaxial two-wheel vehicle 1 in the second control mode. FIGS. 4(C) and 4(D) are flowcharts illustrating operations of the coaxial two-wheel vehicle 1.

In the first control mode shown in FIG. 4(A), the posture of the main body portion 10 is maintained to be constant by performing the inverted pendulum control all the time as described above. Here, in the case where a user operates the hand brake 29 (s21), the controller 21 shifts to the second control mode (s22) in which the rotation of the main wheels 11 is driven and controlled so that an angle of the main body portion 10 with respect to the vertical direction becomes $\theta1'$ which is greater than $\theta1$ as shown in FIG. 4(B). Thereafter, the controller 21 makes the main wheels 11 or the auxiliary wheel 13 locked and makes the brake operation with the hand brake 29 effective (s23). The main wheels 11 or the auxiliary wheel 13 may be locked by a mechanical or electromagnetic method. Thereafter, the controller 21 stops driving and controlling the main wheels 11 (s24). This makes the coaxial two-wheel vehicle 1 completely stopped.

Meanwhile, in the case where the user performs an operation to release the hand brake 29 (s31), the controller 21 makes the lock of the main wheels 11 and the auxiliary wheel 13 released (s32), and the mode is switched to return to the first control mode (s33). This makes it possible to use again the coaxial two-wheel vehicle 1 as a pushcart.

Figure 5A:
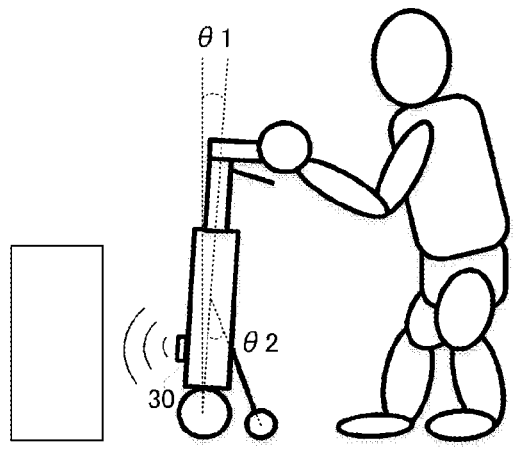
FIGS. 5(A) to 5(C) include diagrams illustrating an example in which the first control mode is switched to the second control mode in accordance with a detection result of an obstacle detection sensor.
Figure 5B:
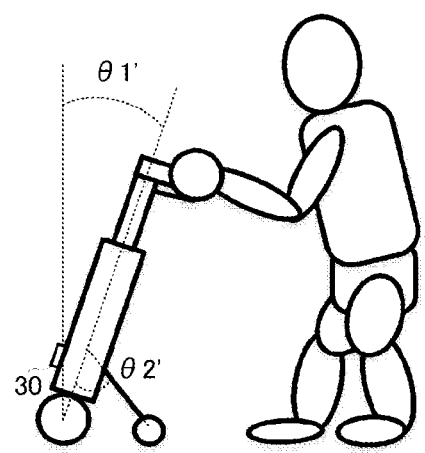
Figure 5C:
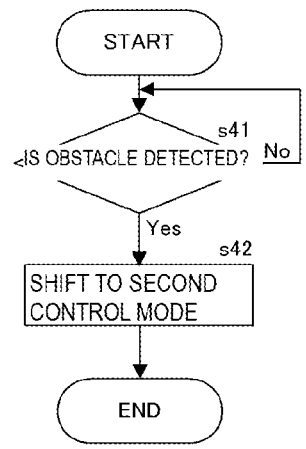

Next, FIGS. 5(A) to 5(C) include diagrams illustrating an example in which the first control mode is switched to the second control mode in accordance with a detection result of an obstacle detection sensor. FIG. 5(A) is a diagram illustrating a posture of the coaxial two-wheel vehicle 1 in the first control mode, and FIG. 5(B) is a diagram illustrating a posture of the coaxial two-wheel vehicle 1 in the second control mode. FIG. 5(C) is a flowchart illustrating operation of the coaxial two-wheel vehicle 1.

In the first control mode shown in FIG. 5(A), the posture of the main body portion 10 is maintained to be constant by performing the inverted pendulum control all the time as described above. Here, in the case where an obstacle detection sensor in the auxiliary sensor 30 that is provided in the front of the main body portion 10 (for example, a sensor making use of ultrasonic waves, infrared rays, or the like) detects an obstacle (s41), the controller 21 shifts to the second control mode (s42) in which the rotation of the main wheels 11 is driven and controlled so that an angle of the main body portion 10 with respect to the vertical direction becomes $\theta1'$ which is greater than $\theta1$ as shown in FIG. 5(B). Also in this case, the controller 21 may stop driving and controlling the main wheels 11 after having shifted to the second control mode. The controller 21 may be made to return to the first control mode when the obstacle detection sensor does not detect any obstacle, or to return to the first control mode only when a user explicitly performs an operation for returning to the first control mode through the user I/F 28 (for example, the power is once turned off and later turned on again).

Figure 6A:
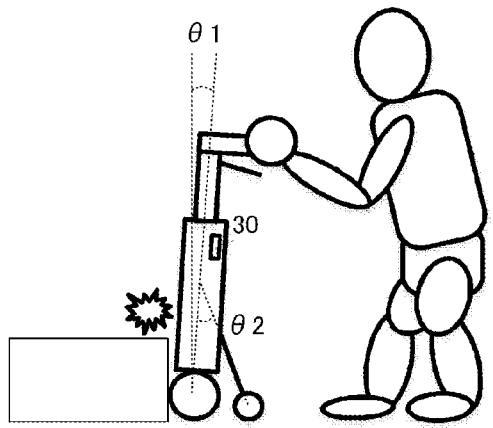
FIGS. 6(A) to 6(C) include diagrams illustrating an example in which the first control mode is switched to the second control mode in accordance with a detection result of an impact detection sensor.
Figure 6B:
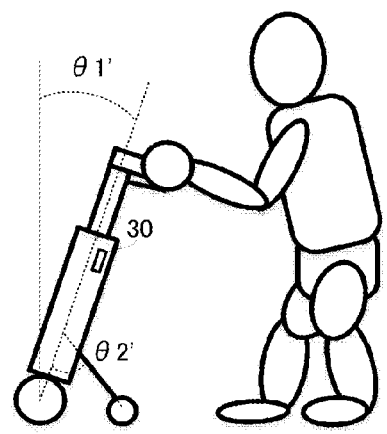
Figure 6C:
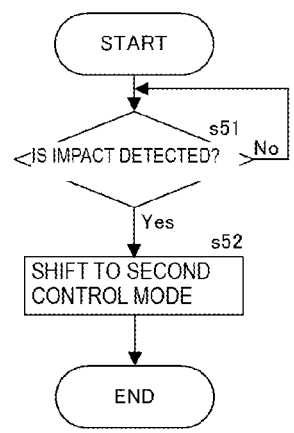

Next, FIGS. 6(A) to 6(C) include diagrams illustrating an example in which the first control mode is switched to the second control mode in accordance with a detection result of an impact detection sensor. FIG. 6(A) is a diagram illustrating a posture of the coaxial two-wheel vehicle 1 in the first control mode, and FIG. 6(B) is a diagram illustrating a posture of the coaxial two-wheel vehicle 1 in the second control mode. FIG. 6(C) is a flowchart illustrating operation of the coaxial two-wheel vehicle 1.

In the first control mode shown in FIG. 6(A), the posture of the main body portion 10 is maintained to be constant by performing the inverted pendulum control all the time as described above. Here, in the case where an impact detection sensor in the auxiliary sensor 30 that is provided in the main body portion 10 detects a large impact such as a bump or the like (s51), the controller 21 shifts to the second control mode (s52) in which the rotation of the main wheels 11 is driven and controlled so that an angle of the main body portion 10 with respect to the vertical direction becomes $\theta1'$ which is greater than $\theta1$ as shown in FIG. 6(B). The impact sensor is configured of, for example, a three-axis acceleration sensor and determines a large impact such as a bump or the like as being detected if acceleration greater than a predetermined threshold is detected.

Also in this case, the controller 21 may stop driving and controlling the main wheels 11 after having shifted to the second control mode. The controller 21 may be made to return to the first control mode after a predetermined period of time has elapsed, or to return to the first control mode only when a user explicitly performs an operation for returning to the first control mode through the user I/F 28.

Next, FIGS. 7(A) to 7(D) include diagrams illustrating an example in which the first control mode is switched to the second control mode corresponding to opening/closing of a seat plate. FIG. 7(A) is a diagram illustrating a posture of the coaxial two-wheel vehicle 1 in the first control mode, and FIG. 7(B) is a diagram illustrating a posture of the coaxial two-wheel vehicle 1 in the second control mode. FIG. 7(C) is a diagram illustrating a state in which a user is seated on the seat plate. FIG. 7(D) is a flowchart illustrating operation of the coaxial two-wheel vehicle 1.

In this example, a seat plate 51 is provided in the front (Y direction) of the main body portion 10. One end of the seat plate 51 is rotatably connected to the main body portion 10, while the other end thereof is detachable with respect to the main body portion 10. The seat plate 51 is set with an angle such that the seat plate 51 is parallel or substantially parallel to the horizontal direction in the case where the main body portion 10 has shifted to the second control mode, and thus the user can sit thereon.

In the first control mode shown in FIG. 7(A), the posture of the main body portion 10 is maintained to be constant by performing the inverted pendulum control all the time as described before. Here, in the case where the auxiliary sensor 30 detects a state that the seat plate 51 is released from the main body portion 10 (s61), the controller 21 shifts to the second control mode (s62) in which the rotation of the main wheels 11 is driven and controlled so that an angle of the main body portion 10 with respect to the vertical direction becomes θ1' which is greater than θ1 as shown in FIG. 7(B). When the controller 21 is shifted to the second control mode, the user can sit on the seat plate 51. Also in this case, the controller 21 may stop driving and controlling the main wheels 11 after having shifted to the second control mode (s63). The controller 21 may be made to return to the first control mode when the auxiliary sensor 30 detects the attachment of the seat plate 51, or to return to the first control mode only when the user explicitly performs an operation for returning to the first control mode through the user I/F 28 (for example, the power is once turned off and later turned on again).

Figure 15A:
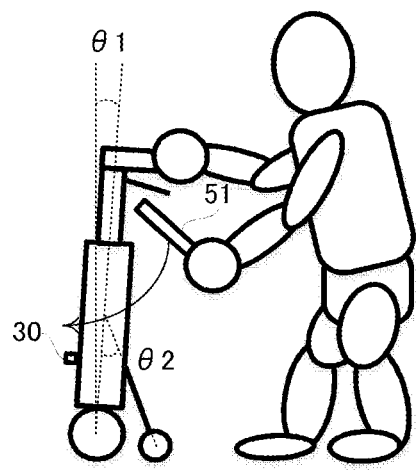
FIGS. 15(A) to 15(D) include diagrams illustrating an example in which the first control mode is switched to the second control mode corresponding to attachment of a seat plate.
Figure 15B:
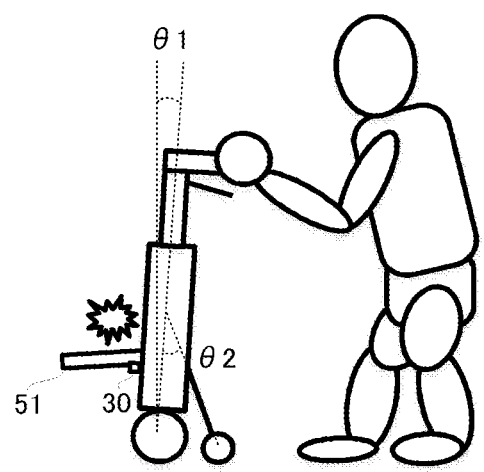
Figure 15C:
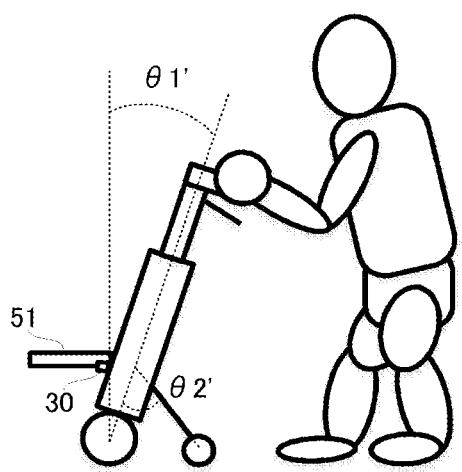
Figure 15D:
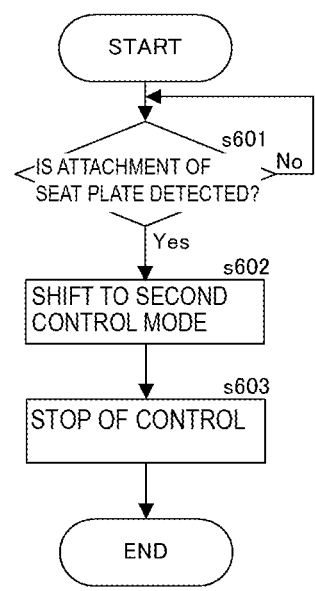

As shown in FIG. 15(A), in the case where a seat plate 51 capable of being detached is used, when the auxiliary sensor 30 detects the attachment of the seat plate 51 to the main body portion 10 (s601), as shown in FIG. 15(B), the controller 21 shifts to the second control mode (s602) in which the rotation of the main wheels 11 is driven and controlled so that an angle of the main body portion 10 with respect to the vertical direction becomes θ1' which is greater than θ1 as shown in FIG. 15(C). This makes it possible for a user to sit on the seat plate 51. Also in this case, the controller 21 may stop driving and controlling the main wheels 11 (s603) after having shifted to the second control mode. The controller 21 may be made to return to the first control mode when the auxiliary sensor 30 detects the detachment of the seat plate 51, or to return to the first control mode only when the user explicitly performs an operation for returning to the first control mode through the user I/F 28.

Figure 16A:
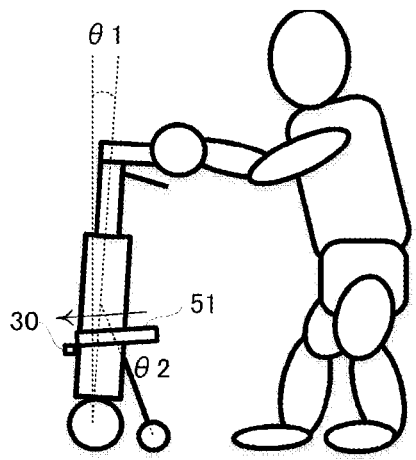
FIGS. 16(A) to 16(D) include diagrams illustrating an example in which the first control mode is switched to the second control mode corresponding to a seat plate being slid.
Figure 16B:
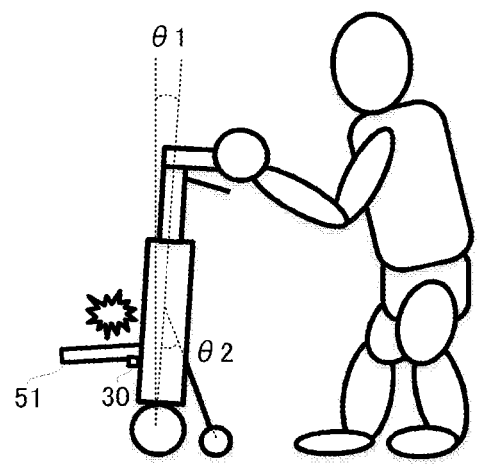
Figure 16C:
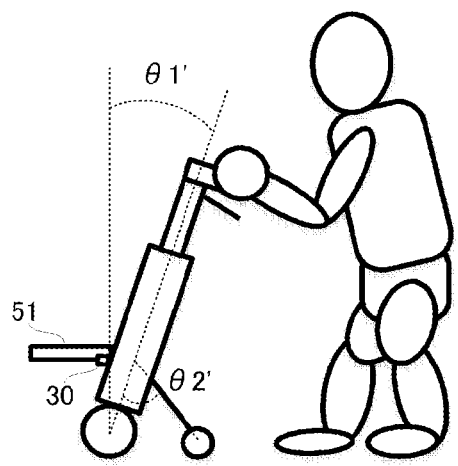
Figure 16D:
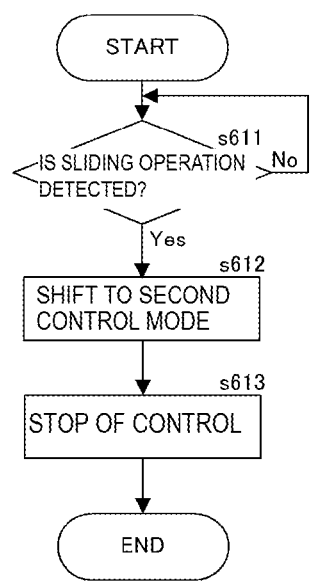

Further, as shown in FIG. 16(A), also in the case where a slide-type seat plate 51 is used, when the auxiliary sensor 30 detects a state that the seat plate 51 is slid in the main body portion 10 and becomes available for being seated on (s611) as shown in FIG. 16(B), the controller 21 shifts to the second control mode (s612) in which the rotation of the main wheels 11 is driven and controlled so that an angle of the main body portion 10 with respect to the vertical direction becomes θ1' which is greater than θ1 as shown in FIG. 16(C). This makes it possible for a user to sit on the seat plate 51. Also in this case, the controller 21 may stop driving and controlling the main wheels 11 (s613) after having shifted to the second control mode. The controller 21 may be made to return to the first control mode when the auxiliary sensor 30 detects the detachment of the seat plate 51, or to return to the first control mode only when the user explicitly performs an operation for returning to the first control mode through the user I/F 28.

Figure 8A:
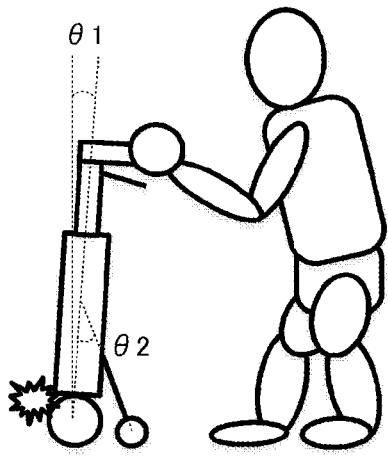
FIGS. 8(A) to 8(C) include diagrams illustrating an example in which the first control mode is switched to the second control mode based on presence/absence of torque of abnormal condition.
Figure 8B:
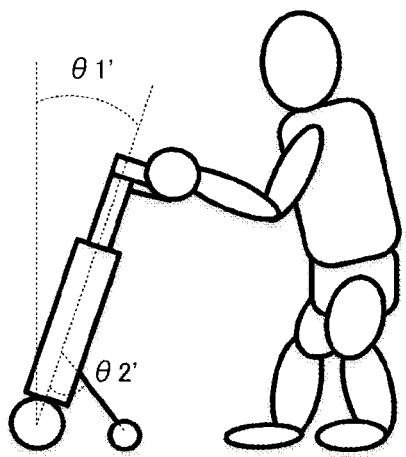
Figure 8C:
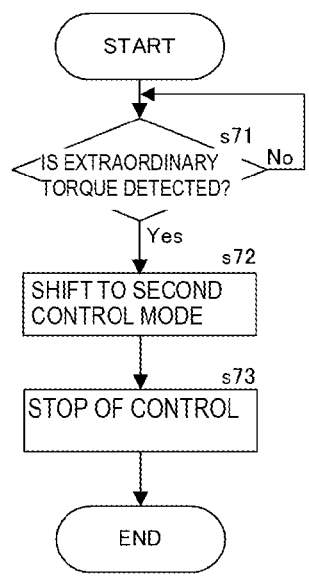

Next, FIGS. 8(A) to 8(C) include diagrams illustrating an example in which the first control mode is switched to the second control mode based on presence/absence of extraordinary motor torque. FIG. 8(A) is a diagram illustrating a posture of the coaxial two-wheel vehicle 1 in the first control mode, and FIG. 8(B) is a diagram illustrating a posture of the coaxial two-wheel vehicle 1 in the second control mode. FIG. 8(C) is a flowchart illustrating operation of the coaxial two-wheel vehicle 1.

In the first control mode shown in FIG. 8(A), the posture of the main body portion 10 is maintained to be constant by performing the inverted pendulum control all the time as described before. Here, in the case where the torque generated for the main wheels 11 is found to be extraordinary (s71), the controller 21 shifts to the second control mode (s72) in which the rotation of the main wheels 11 is driven and controlled so that an angle of the main body portion 10 with respect to the vertical direction becomes θ1' which is greater than θ1 as shown in FIG. 8(B). Thereafter, the controller 21 stops driving and controlling the main wheels 11 (s73). Through this, in the case where an unfavorable situation such as a foreign object being caught in the main wheel 11 or the like occurs, for example, it is possible to protect the motor and shift to a safe state in which the main body portion 10 will not overturn. Note that the torque generated for the main wheels 11 can be detected by referring to a current supplied to the motor. For example, in the case where an instantaneous value of the torque becomes no less than a predetermined threshold, or a value of the torque becomes no less than a predetermined threshold continuously for a period of time which is equal to or greater than a predetermined time, the above torque is detected as being extraordinary.

In this case, it is preferable for the controller 21 to be made to return to the first control mode only when the user explicitly performs an operation for returning to the first control mode through the user I/F 28.

Figure 9A:
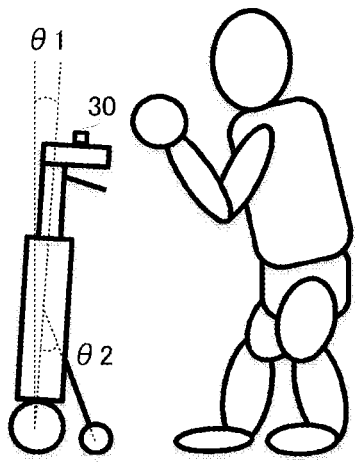
FIGS. 9(A) to 9(C) include diagrams illustrating an example in which the first control mode is switched to the second control mode based on presence/absence of a human body contact.
Figure 9B:
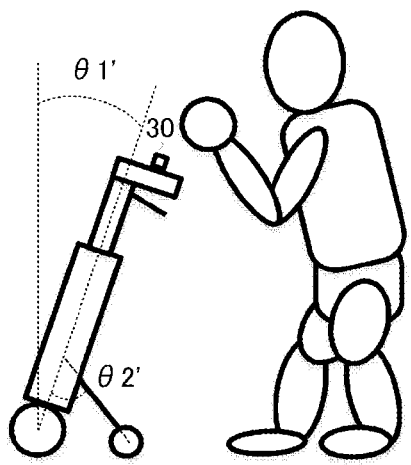
Figure 9C:
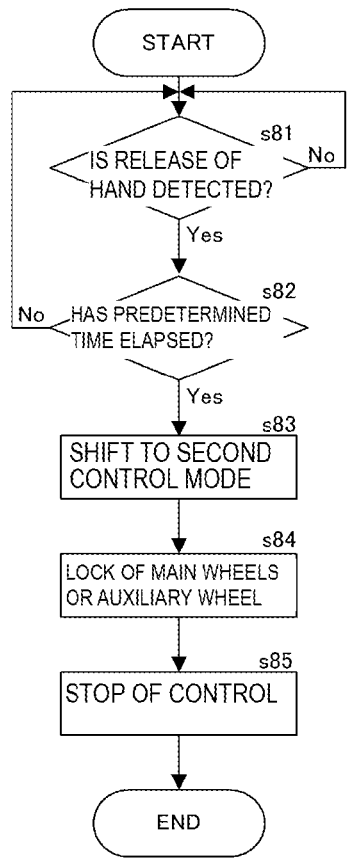

Next, FIGS. 9(A) to 9(C) include diagrams illustrating an example in which the first control mode is switched to the second control mode based on presence/absence of a human body contact. FIG. 9(A) is a diagram illustrating a posture of the coaxial two-wheel vehicle 1 in the first control mode (the moment a user has released the coaxial two-wheel vehicle 1), and FIG. 9(B) is a diagram illustrating a posture of the coaxial two-wheel vehicle 1 in the second control mode. FIG. 9(C) is a flowchart illustrating operation of the coaxial two-wheel vehicle 1.

In the first control mode shown in FIG. 9(A), the posture of the main body portion 10 is maintained to be constant by performing the inverted pendulum control all the time as described before. Here, in the case where, a touch sensor in the auxiliary sensor 30 that is provided in the grip unit 16 detects a hand of the user as being released (s81) and a predetermined period of time has elapsed (s82), the controller 21 shifts to the second control mode (s83) in which the rotation of the main wheels 11 is driven and controlled so that an angle of the main body portion 10 with respect to the vertical direction becomes θ1' which is greater than θ1 as shown in FIG. 9(B). Thereafter, the controller 21 makes the main wheels 11 or the auxiliary wheel 13 be locked, and makes the movement of the coaxial two-wheel vehicle 1 be stopped (s84). Then, the driving and controlling of the main wheels 11 is stopped (s85). Through this, the coaxial two-vehicle 1 comes to be completely stopped.

Figure 10:
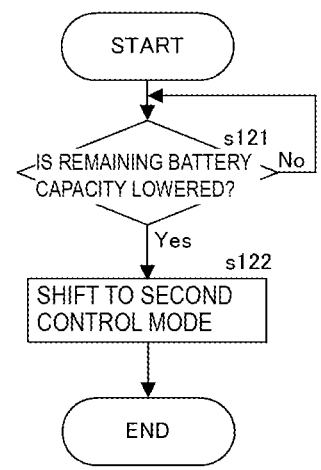
FIG. 10 is a diagram illustrating an example in which the first control mode is switched to the second control mode in accordance with a remaining battery capacity.

Next, FIG. 10 is a diagram (flowchart) illustrating an example in which the first control mode is switched to the second control mode in accordance with a remaining battery capacity.

If no battery capacity is left, the inverted pendulum control cannot be performed so that the main body portion is likely to overturn. As such, in the case where the remaining battery capacity becomes lower than a predetermined threshold (s121), the controller 21 shifts to the second control mode (s122) in which the rotation of the main wheels 11 is driven and controlled so that an angle of the main body portion 10 with respect to the vertical direction becomes θ1' which is greater than θ1. In this case, it is preferable that the controller 21 maintains the second control mode and not return to the first control mode until the remaining battery capacity is so recovered as to be equal to or greater than a predetermined threshold.

Figure 11A:
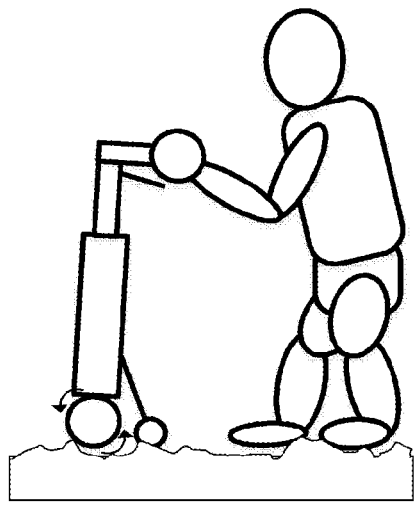
FIGS. 11(A) to 11(C) include diagrams illustrating an example in which the first control mode is switched to the second control mode based on presence/absence of idle rotation of a main wheel.
Figure 11B:
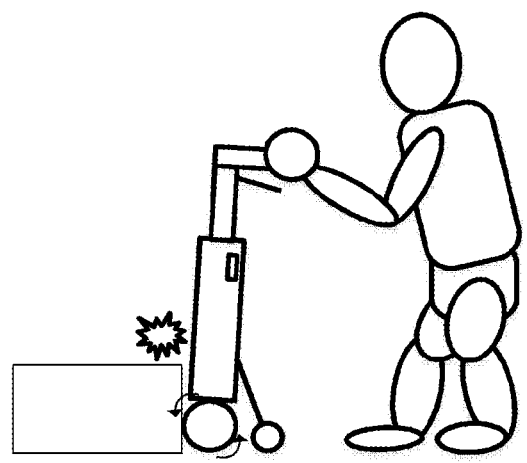
Figure 11C:
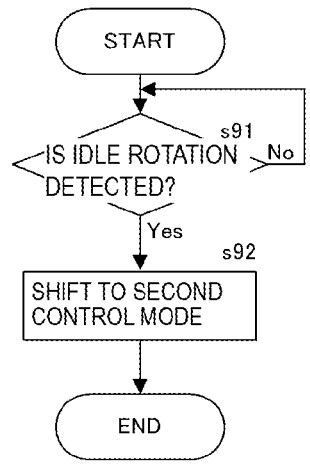

Next, FIGS. 11(A) to 11(C) include diagrams illustrating an example in which the first control mode is switched to the second control mode based on presence/absence of the idle rotation of the main wheels.

FIG. 11(A) is a diagram illustrating a case in which the main wheels 11 idle when travelling on a bumpy road, and FIG. 11(B) is a diagram illustrating a case in which the main wheels 11 idle when bumping into an obstacle. FIG. 11(C) is a flowchart illustrating operation of the coaxial two-wheel vehicle 1.

In this example, in the case where the idle rotation of the main wheels 11 is detected (s91), the controller 21 shifts to the second control mode (s92) in which the rotation of the main wheels 11 is driven and controlled so that an angle of the main body portion 10 with respect to the vertical direction becomes θ1' which is greater than θ1. The idle rotation of the main wheels 11 can be detected by referring to a value of a rotary encoder in the auxiliary sensor 30 or by referring to motor torque.

However, in the case where the main wheels 11 are idling, even if the stated main wheels 11 are driven and controlled, the main body portion 10 cannot be moved forward. This sometimes makes it difficult to enlarge an angle of the main body portion 10 with respect to the vertical direction. As such, the controller 21 controls the auxiliary wheel driver 27 to drive and control the auxiliary wheel 13 so that the main body portion 10 rotates toward a rear side thereof and the angle of the main body portion 10 with respect to the vertical direction is consequently enlarged, and shifts to the second control mode. Alternatively, the controller 21 controls the support unit driver 25 to drive the motor provided at the connecting portion between the main body portion 10 and the support unit 12 so that an angle formed by the main body portion 10 and the support unit 12 is enlarged, and shifts to the second control mode.

Figure 12A:
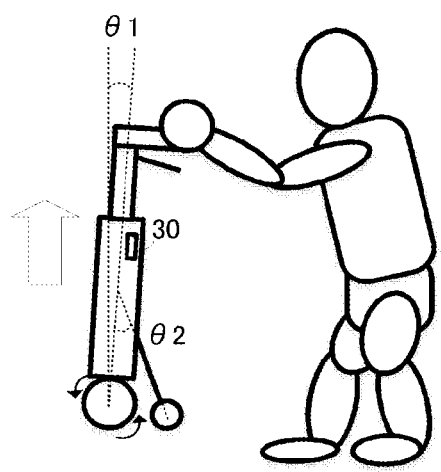
FIGS. 12(A) to 12(C) include diagrams illustrating operation when a coaxial two-wheel vehicle is lifted.
Figure 12B:
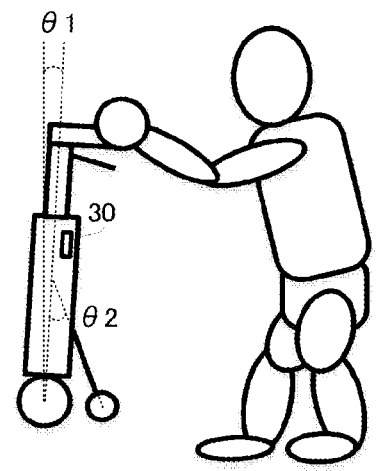
Figure 12C:
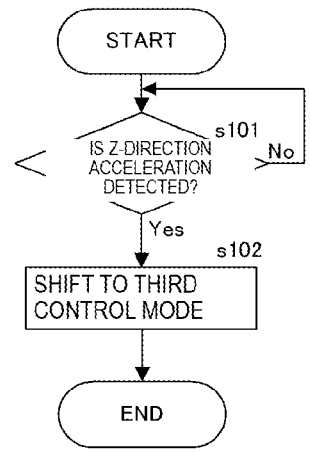

In the case where a user lifts the coaxial two-wheel vehicle 1, the main wheels 11 idle as a result. However, in this case, it may be allowed to shift to a third control mode as shown in FIG. 12. FIGS. 12(A) to 12(C) include diagrams illustrating operation when the coaxial two-wheel vehicle 1 is lifted.

FIG. 12(A) is a diagram illustrating a posture of the coaxial two-wheel vehicle 1 in the first control mode (the moment a user has lifted the coaxial two-wheel vehicle 1), and FIG. 12(B) is a diagram illustrating a posture of the coaxial two-wheel vehicle 1 in the third control mode. FIG. 12(C) is a flowchart illustrating operation of the coaxial two-wheel vehicle 1. For example, the user lifts the coaxial two-wheel vehicle 1 in the case where there exists a large step in some case.

The third control mode is a state in which an angle formed by the main body portion 10 and the support unit 12 is so maintained as to be θ2 and the driving and controlling of the main wheels 11 is stopped. In the case where a three-axis acceleration sensor in the auxiliary sensor 30 detects acceleration in the Z direction (s101), the controller 21 determines the coaxial two-wheel vehicle 1 as being lifted and shifts to the third control mode (s102).

When having shifted to the third control mode, since the angle formed by the main body portion 10 and the support unit 12 is so maintained as to be θ2, the support unit 12, the auxiliary wheel 13, and so on will not become obstacles. In addition, the idle rotation of the main wheels 11 is stopped, whereby safety is further improved.

Figure 13A:
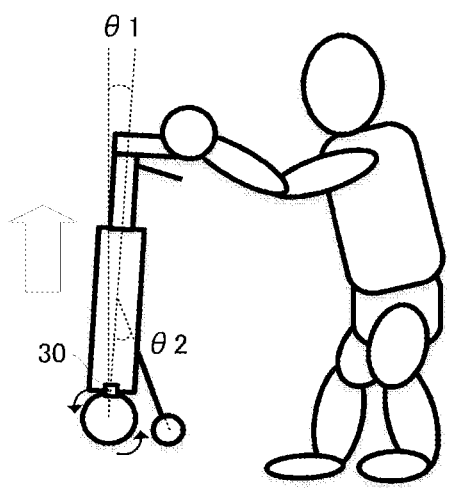
FIGS. 13(A) to 13(C) include diagrams illustrating operation when a coaxial two-wheel vehicle is lifted.
Figure 13B:
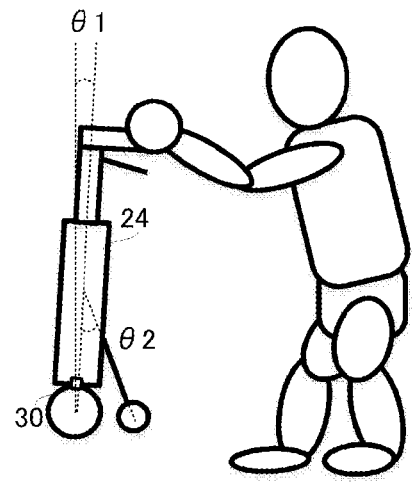
Figure 13C:
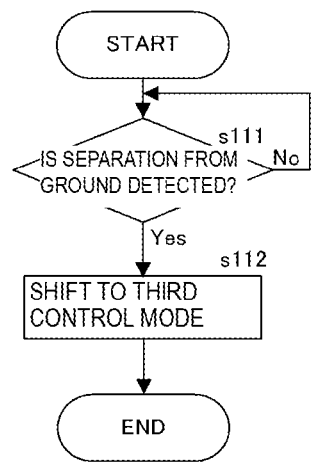

FIGS. 13(A) to 13(C) include diagrams illustrating an example in which a ground sensor is used in place of the three-axis acceleration sensor. FIG. 13(A), like FIG. 12(A), is a diagram illustrating a posture of the coaxial two-wheel vehicle 1 in the first control mode (the moment a user has lifted the coaxial two-wheel vehicle 1), and FIG. 13(B) is a diagram illustrating a posture of the coaxial two-wheel vehicle 1 in the third control mode. FIG. 13(C) is a flowchart illustrating operation of the coaxial two-wheel vehicle 1.

In the case where a ground sensor in the auxiliary sensor 30 detects a state that the main wheels 11 are separated from the ground (s111), the controller 21 determines the coaxial two-wheel vehicle 11 as being lifted, and shifts to the third control mode (s112). The ground sensor performance can be also realized by measuring a distance from the ground surface using infrared rays or the like, detecting pressure applied on the shaft of the main wheels 11, or detecting a change in posture of suspension in the case where the suspension is provided on the main wheels 11, for example.

In the above embodiment, although an example in which the support unit 12 is rotatably connected to the main body portion 10 is described, the support unit 12 may be fixedly connected to the main body portion 10 and an angle formed by the main body portion 10 and the support unit 12 may be θ2' all the time.

Figure 14A:
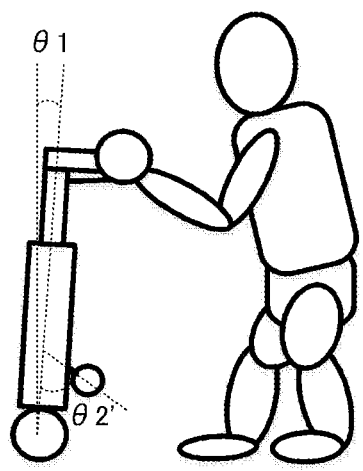
FIGS. 14(A) and 14(B) include diagrams illustrating an example in which a support unit is stretchable.
Figure 14B:
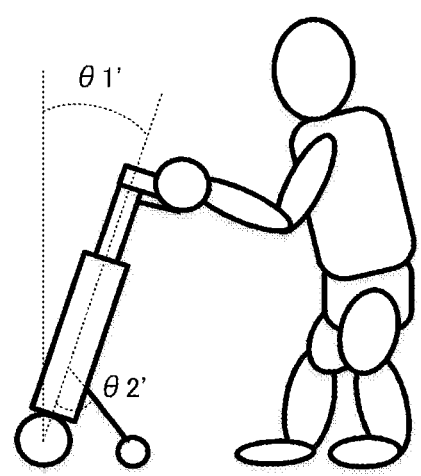

Further, in the case where the support unit 12 is stretchable and its length can be varied, it is also possible to employ a mode in which the support unit 12 is contracted in the first control mode as shown in FIG. 14(A) and extended in the second control mode as shown in FIG. 14(B). In this case, even if the angle formed by the main body portion 10 and the support unit 12 is θ2' all the time, the support unit 12 will not become an obstacle in the first control mode.

10 main body portion
11 main wheel
12 support unit
13 auxiliary wheel
15 handle
16 grip unit
20 slope angle sensor
21 controller
22 ROM
23 RAM
24 gyro sensor
25 support unit driver
26 main wheel driver
27 auxiliary wheel driver
28 user I/F
29 hand brake
30 auxiliary sensor

The invention claimed is:
1. A mobile body comprising:
a first wheel;
a main body portion configured to rotatably support the first wheel;
a support unit having one end connected to the main body portion;
a drive controller configured to drive and control the first wheel; and
a sensor configured to detect an angular change of a slope angle of the main body portion in a pitch direction,
wherein the drive controller has a first control mode in which rotation of the first wheel is controlled based on an output from the sensor so that the angular change of the main body portion becomes 0 and the angle of the main body portion with respect to a vertical direction takes a first angle, and a second control mode in which the rotation of the first wheel is controlled based on the output from the sensor and the main body portion is inclined toward a side where the support unit is con- nected so that the angle of the main body portion with respect to the vertical direction takes a second angle greater than the first angle, the mobile body further including:
a changeover means configured to switch between the first control mode and the second control mode,
wherein an angle formed by the main body portion and the support unit in the first control mode is greater than an angle formed by the main body portion and the support unit in the second control mode.

2. The mobile body according to claim 1,
wherein the drive controller is configured to switch between the first control mode and the second control mode in a case where the drive controller receives a command to stop the rotation of the first wheel.

3. The mobile body according to claim 2, further comprising:
an obstacle detection sensor,
wherein the changeover means is configured to switch between the first control mode and the second control mode in accordance with an output of the obstacle detection sensor.

4. The mobile body according to claim 2, further comprising:
an impact detection sensor,
wherein the changeover means is configured to switch between the first control mode and the second control mode in accordance with an output of the impact detection sensor.

5. The mobile body according to claim 2, further comprising:
a seat plate having one end rotatably jointed to the main body portion; and
a seat plate sensor configured to detect whether or not the seat plate has a predetermined angle with respect to the main body portion,
wherein the changeover means is configured to switch between the first control mode and the second control mode in accordance with an output of the seat plate sensor, and
the drive controller stops driving and controlling the first wheel after shifting to the second control mode.

6. The mobile body according to claim 2, further comprising:
a torque detection sensor configured to detect whether or not torque generated by the drive controller for the first wheel exceeds a predetermined value,
wherein the changeover means is configured to switch between the first control mode and the second control mode in accordance with an output of the torque detection sensor.

7. The mobile body according to claim 1, further comprising:
an obstacle detection sensor,
wherein the changeover means is configured to switch between the first control mode and the second control mode in accordance with an output of the obstacle detection sensor.

8. The mobile body according to claim 7, further comprising:
an impact detection sensor,
wherein the changeover means is configured to switch between the first control mode and the second control mode in accordance with an output of the impact detection sensor.

9. The mobile body according to claim 7, further comprising:
a seat plate having one end rotatably jointed to the main body portion; and
a seat plate sensor configured to detect whether or not the seat plate has a predetermined angle with respect to the main body portion,
wherein the changeover means is configured to switch between the first control mode and the second control mode in accordance with an output of the seat plate sensor, and
the drive controller stops driving and controlling the first wheel after shifting to the second control mode.

10. The mobile body according to claim 7, further comprising:
a torque detection sensor configured to detect whether or not torque generated by the drive controller for the first wheel exceeds a predetermined value,
wherein the changeover means is configured to switch between the first control mode and the second control mode in accordance with an output of the torque detection sensor.

11. The mobile body according to claim 1, further comprising:
an impact detection sensor,
wherein the changeover means is configured to switch between the first control mode and the second control mode in accordance with an output of the impact detection sensor.

12. The mobile body according to claim 11, further comprising:
a seat plate having one end rotatably jointed to the main body portion; and
a seat plate sensor configured to detect whether or not the seat plate has a predetermined angle with respect to the main body portion,
wherein the changeover means is configured to switch between the first control mode and the second control mode in accordance with an output of the seat plate sensor, and
the drive controller stops driving and controlling the first wheel after shifting to the second control mode.

13. The mobile body according to claim 11, further comprising:
a torque detection sensor configured to detect whether or not torque generated by the drive controller for the first wheel exceeds a predetermined value,
wherein the changeover means is configured to switch between the first control mode and the second control mode in accordance with an output of the torque detection sensor.

14. The mobile body according to claim 1, further comprising:
a seat plate having one end rotatably jointed to the main body portion; and
a seat plate sensor configured to detect whether or not the seat plate has a predetermined angle with respect to the main body portion,
wherein the changeover means is configured to switch between the first control mode and the second control mode in accordance with an output of the seat plate sensor, and
the drive controller stops driving and controlling the first wheel after shifting to the second control mode.

15. The mobile body according to claim 1, further comprising:
a torque detection sensor configured to detect whether or not torque generated by the drive controller for the first wheel exceeds a predetermined value,
wherein the changeover means is configured to switch between the first control mode and the second control mode in accordance with an output of the torque detection sensor.

16. The mobile body according to claim 1, further comprising:
a touch sensor provided on a part of the main body portion and configured to detect whether or not a human body is touching the main body portion,
wherein the changeover means is configured to switch between the first control mode and the second control mode in accordance with an output of the touch sensor.

17. The mobile body according to claim 1, further comprising:
a power storage means for storing power used to drive and control the drive controller; and
a remaining capacity detection sensor configured to detect a remaining power storage capacity of the power storage means,
wherein the changeover means is configured to switch between the first control mode and the second control mode in accordance with an output of the remaining capacity detection sensor.

18. The mobile body according to claim 1,
wherein the support unit is connected rotatably in the pitch direction of the main body portion.

19. The mobile body according to claim 1, further comprising:
a second wheel supported at another end of the support unit in a rotatable manner.

20. The mobile body according to claim 19, further comprising:
an idle rotation detection sensor configured to detect idle rotation of the first wheel,
wherein the changeover means is configured to switch between the first control mode and the second control mode by driving and controlling the second wheel in accordance with an output of the idle rotation detection sensor.

* * * * *